United States Patent [19]
Duvier, Jr.

[11] Patent Number: 4,518,431
[45] Date of Patent: May 21, 1985

[54] LIGHT WEIGHT INSULATING BUILDING BLOCKS AND METHOD OF MAKING SAME

[76] Inventor: Henry A. Duvier, Jr., 1912 Shamrock Dr., Brentwood, Tenn. 37027

[21] Appl. No.: 639,475

[22] Filed: Aug. 10, 1984

[51] Int. Cl.$^3$ .............................................. C04B 7/02
[52] U.S. Cl. ....................................... 106/97; 52/612; 106/98; 106/99; 106/DIG. 1; 106/DIG. 2
[58] Field of Search ............... 106/97, 98, 99, DIG. 1, 106/DIG. 2; 52/612

[56] References Cited
U.S. PATENT DOCUMENTS

| | | | |
|---|---|---|---|
| 4,210,457 | 7/1980 | Dodson et al. | 106/97 |
| 4,222,785 | 9/1980 | Henderson | 106/DIG. 2 |
| 4,293,341 | 10/1981 | Dudley et al. | 106/97 |
| 4,320,606 | 3/1982 | Gangarao | 52/612 |
| 4,330,632 | 5/1982 | Haynes et al. | 106/97 |
| 4,351,670 | 9/1982 | Grice | 106/97 |
| 4,370,166 | 1/1983 | Powers | 106/97 |
| 4,372,092 | 2/1983 | Lopez | 52/612 |

Primary Examiner—Arthur P. Demers
Attorney, Agent, or Firm—Alan Ruderman

[57] ABSTRACT

An ultra light weight insulating building block is manufactured from an aggregated particulate formed by mixing expanded perlite together with cement in the proportions of approximately 24 parts of perlite for each part of cement by volume and thereafter adding a minimum amount of potable water to agglomerate the contents until the mixture is tacky. The mixture is thereafter cured in air to form the agglomerated particulate which may thereafter be used together with cementious material to manufacture the building blocks. The cementious material may be cement or a mixture of cement, fly ash and an air entrainer.

19 Claims, No Drawings

LIGHT WEIGHT INSULATING BUILDING BLOCKS AND METHOD OF MAKING SAME

BACKGROUND OF THE INVENTION

This invention relates to ultra light weight load bearing cementious ceramic containing blocks, having high insulating properties, and a method of manufacturing such blocks inexpensively yet providing the block with the desired properties.

The need for building materials having higher thermal insulation properties has been recognized and a number of proposals to better insulate buildings have been made. The use of additional insulation may be necessary for certain applications, but in regard to the outer walls additional insulation would require a change in the conventional wall thickness. Such a change in the thickness of the wall, whether it be an exterior wall or an interior wall, would result in substantial increases in building construction costs.

Since concrete is a major component of most buildings the prior art abounds with proposals formulating a cement mix having the various properties of low thermal resistance, light weight and high strength. Frequently, this type of product is formulated by a mixture of a concrete mix including light weight expanded aggregate materials. However, such prior art concrete materials have not proved successful in attaining their objects and those materials having low thermal resistance (high "R" values) such as materials containing expanded perlite or vermiculite do not possess sufficient strength for structural use, while those materials having sufficient structural strength have low R values. In practice it is difficult to achieve the reductions in density theoretically possible with additions of particulate expanded ceramics because of the poor mechanical properties of the expanded ceramics. The process of mixing the expanded ceramics with cementious materials (cement or mixtures of cement) normally results in the fracture and attrition of the expanded ceramic into smaller high density fragments. Thus, no known prior art proposals have been able to attain the long sought after combination of properties of high strength, light weight and high R value. Examples of the known prior art materials include Dudley, et al U.S. Pat. No. 4,293,341; Dodson, et al U.S. Pat. No. 4,210,457; Gray U.S. Pat. No. 4,042,406; Bowles, et al U.S. Pat. No. 3,764,357 and Redsky U.S. Pat. No. 2,858,227. Gray illustrates the problem where a light weight block is proposed for non-load bearing interior partitions.

SUMMARY OF THE INVENTION

Consequently, it is a primary object of the present invention to provide an improved light weight, load bearing, high thermal resistance building block and a method for manufacturing such blocks.

It is another object of the present invention to provide a building block including cement and friable particulate expanded ceramic aggregate in which the ceramic particles are coated with and protected by the cement, and a method of manufacturing the block.

It is a further object of the present invention to provide an improved particulate for mixing with cementious material, the particulate having a low density and sufficient strength to resist fracture and attrition during mixing, giving the cementious material when cured, added strength, and a method for preparing such particulates.

It is a still further object of the present invention to provide a method for forming an improved particulate of perlite and cement and the method of using the perlite in a cementious mixture to form light weight building blocks having high load bearing capacity and a high thermal resistance.

Accordingly, the present invention effectively provides a two part process for manufacturing a building block similar to the commonly used concrete blocks but having a very light weight and high insulation value relative to such concrete blocks. The first part of the process comprises mixing an expanded ceramic aggregate, preferably perlite, together with cement, such as Portland cement type I or type III, in the proportions of approximately 24 parts of perlite for each part of cement by volume or approximately 1.75 to 2 parts of perlite for each part of cement by weight, and after thoroughly blending the mixture, adding a minimum amount of potable water to agglomerate the contents by mixing until the mixture is tacky. The amount of added water required will depend upon and vary with certain factors including ambient conditions and the amount of moisture in the materials initially, but generally two gallons of water are used with each four cubic feet of perlite and 1/6 cubic foot of cement. After the mixture has become tacky, it is permitted to dry and cure, the curing occurring by air drying for at least 24 hours. At this point the material comprises an aggregation of dry and hard particulate matter which can then be used to make building blocks.

In the second part of the process the particulate product obtained (hereinafter designated "the agglomerated particulate") in the first part is then mixed with cementious material and water and is cast into molds to form the blocks. The cementious material may be cement or preferably a combination of cement, fly ash and an air entrainer. The amount of cement added to the agglomerated particulate for forming the blocks comprises the amount generally utilized for manufacturing concrete blocks reduced by the amount used to agglomerate the agglomerate particulate of the first part of the process. In other words, for each part of cement used in forming the agglomerated particulate of the first part of the process, an equivalent amount is subtracted from the usual cement formulation of concrete blocks. Thus, for each pound of cement used in the initial part of the process, approximately 5 pounds of additional cement or cementious material is used to make the blocks so that the total amount of cement or cementious mixture is approximately 2.9 to 3.35 parts by weight for each part of ceramic particulate, or approximately 4 parts by volume of ceramic material for each part of cementious mixture used.

These and additional objects and advantages of the invention will become apparent from the following illustrative embodiment.

DESCRIPTION OF THE PREFERRED EMBODIMENT

In accordance with the present invention an ultra light weight, load bearing building block having high thermal resistance is obtained, which when formed in the size of conventional or standard 8 inch blocks such as conventional two core 8×8×16 concrete blocks weighs in the order of 14 to 16 pounds whereas such conventional blocks weigh in the order of 38 to 42 pounds. The insulating value or R value of the block has been calculated to be approximately 19 when the cores are filled with loose ceramic. This is approximately 50 to 100 percent greater than the standard concrete blocks currently used. The compression strength can be varied between approximately 350 PSI to 1,000 PSI by increasing the formulation of cement and/or fly ash in the second part of the process, and with the specific formulations hereinafter described, by way of example only, the compression strength is approximately 750 PSI which in most cases places it in the load bearing class.

A low density granular ceramic material of approximately 7 to 8 pounds per cubic foot is utilized to formulate the particulate of the first part of the process. The preferred ceramic perlite, which is a volcanic rock material that has been expanded by popping or puffing at relatively high temperatures in a furnace. The particle size should be of such a nature that the material will readily mix with the other ingredients and not segregate, once mixed, from the other materials, and should be of a size from −6 mesh to +325 mesh. Ideally the size specification should be as follows:

| U.S. Standard Sieve | Particle Size Weight % |
|---|---|
| +8 | 2% |
| +16 | 32% |
| +30 | 79% |
| +50 | 89% |
| +100 | 92% |
| −100 | 8% |

The material is then thoroughly mixed with cement. The cement preferably may be Portland cement type I or III. In laboratory sampling a bag of perlite which is approximately 4 cubic feet and weighs between 28 to 32 pounds (7 to 8 pounds per cubic foot) was mixed with 1 bag of Portland cement which is approximately 1 cubic foot and approximately 94 pounds as follows: the perlite and one sixth (1/6) of the cement (approximately 15.66 pounds) was mixed dry until it was thoroughly blended. Thereafter this mixture was mixed with water until tacky. The amount of water was approximately 2 gallons, but the amount of water may vary. The important thing is that the water should be potable and that the mixture should agglomerate or become tacky and not be soupy nor adhere and be sticky. This provides a coating of cement about the particles of perlite. The next step is to let the agglomeration cure, and this requires air drying for at least 24 hours. Even if the agglomeration is artificially dried, the ceramic mixture of cement and perlite should be allowed to air dry for 24 hours minimum.

The resulting product comprises the agglomerated particulate of the invention which may be used to manufacture building blocks with the desired properties. The perlite is effectively encased or encapsulated by a coating of cement and the perlite is protected during the subsequent step of preparing the blocks so that the fracture and attrition of the expanded ceramic into smaller relatively high density fragments which normally occur in the prior art processes is precluded. This is the reason that the particles should not be permitted to adhere when the perlite and cement is mixed with water. Thus, the high R value of the perlite is not lost in the process.

Subsequently, the agglomerated particulate is mixed with the cementious materials in the second part of the process. In the laboratory sampling, the remainder of the Portland cement, i.e., 5/6 of the original 1 cubic foot (approximately 78.33 pounds) was then mixed with the agglomerated particulate and approximately 10 gallons of potable water in the usual manner in which cement is mixed. The mixture was then poured into molds and blocks cast. It should be understood that the cement content of the blocks was reduced by the amount of cement used to form the agglomerated particulate. In this manner the block has a maximum insulation value and strength, yet the cost factor is minimum. Thus, when making the blocks according to the present invention the amount of cement which would normally be used is reduced by the amount of cement used to form the agglomerated particulate.

Rather than utilizing Portland cement alone to cast concrete blocks, it is customery to substitute fly ash which makes the blocks harder, stronger and less expensive, and to use an air entraining or foaming agent which provides a more homogenenous mixture and a better yield. The present invention takes this into account when using the agglomerated particulate, and during the block forming process fly ash preferably may be substituted on a 1 to 1 basis for 20 percent of the cement during the second part of the process, i.e., when making the blocks. It has been found that it is important to use approximately 20 pounds of fly ash as a substitute for an equal amount of cement when, the formulation of the blocks began in the initial part of the process with 4 cubic feet of perlite, so that rather than 94 pounds of cement being utilized only 74 pounds total is used. It should be clear, however, that no fly ash is substituted for cement in the formulation of the agglomerated particulate. The fly ash is the finely divided residue that results from the combustion of ground or powdered coal which is transported from the combustion chamber by exhaust gases. The specification to cover the fly ash can be found in ASTM C618-68T, which specifies the use of Pozzolan as an admixture in concrete where Pozzolan action is desired. The ideal fly ash, and that which was used, is probably Class F Pozzolan and should be of a size from −200 mesh to +400 mesh. Also a small amount of a variety of air entrainers or foaming materials such as NVX (vinsol emulsion) manufactured by Hercules Chemical Company has been included in the formulation with excellent results. The air entraining agents should meet ASTM Specification C 150 Type I.

The following formulation for 1 standard 8 inch size load bearing block including the amount of perlite and cement used to form the agglomerated particulate of the first part of the block forming process and thereafter used with cementious material to form the block is as follows:

| | |
|---|---|
| Perlite | 0.4 ft$^3$ ± 5% (0.0113 m$^3$ ± 5%) |
| | 3.0 lbs ± 10% (1360.8 gms. ± 10%) |
| Fly Ash | 2.0 lbs ± 10% (907.2 gms. ± 10%) |
| Cement | 7.4 lbs ± 5% (3356.6 gms. ± 5%) |
| Air Entrainer (NVX) | 0.4 ozs. ± 10% (11.32 gms. ± 10%) |

With this formulation the block so constructed will have a compression strength of approximately 750 PSI and an R factor of approximately 19 when filled with a loose ceramic of approximately 3 pounds per cubic foot. The volumetric ratio of perlite to cement and fly ash is approximately 4 to 1 and the weight ratio is approxiamtely 31.3 to 1.

Numerous alterations of the structure herein disclosed will suggest themselves to those skilled in the art. However it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention what is claimed herein is:

1. An agglomerated particulate for use in manufacturing light weight structural building blocks having high thermal resistance, comprising expanded ceramic aggregates and cement in the ratio of approximately 24 parts of ceramic aggregates to 1 part of cement by volume in an agglomeration admixed with water and cured in air for at least 24 hours, the surface of said ceramic aggregates being coated with and encased in the cement without adhesion of the ceramic particles.

2. An agglomerated particulate as recited in claim 1, wherein said ceramic aggregate comprises perlite weighing approximately 7 to 8 pounds per cubic foot.

3. An agglomerated particulate as recited in claim 2, wherein said cement comprises the group consisting of Portland cement type I and type III.

4. A light weight high thermal resistance structural building block comprising an agglomerated particulate and cementious material, said agglomerated particulate comprising expanded ceramic aggregates and cement in the ratio of approximately 24 parts of ceramic aggregates to 1 part of cement by volume in an agglomeration admixed with water and cured in air for at least 24 hours, the surface of said ceramic aggregates being coated with and encased in the cement without adhesion of the ceramic particles, and said cementious material comprising cement, fly ash and an air entrainer.

5. A light weight high thermal resistance structural building block as recited in claim 4, wherein the amount of ceramic aggregate in the block comprises approximately 32% by weight of the block.

6. A light weight high thermal resistance structural building block as recited in claim 4, wherein said ceramic aggregate comprises perlite weighing approximately 7 to 8 pounds per cubic foot.

7. A light weight high thermal resistance structural building block as recited in claim 4, wherein said cement comprises the group consisting of Portland cement type I and type III.

8. A light weight high thermal resistance structural building block as recited in claim 7, wherein the amount of ceramic aggregate in the block comprises approximately 32% by weight of the block.

9. A light weight high thermal resistance structural building block as recited in claim 8, wherein the total amount of cement in the block comprises approximately 60% by weight of the block.

10. A light weight high thermal resistance structural building block as recited in claim 6, wherein said cement comprises the group consisting of Portland cement type I and type III.

11. A light weight high thermal resistance structural building block as recited in claim 9, wherein said ceramic aggregate comprises perlite weighing approximately 7 to 8 pounds per cubic foot.

12. A light weight high thermal resistance structural building block as recited in claim 11, wherein said cement comprises the group consisting of Portland cement type I and type III.

13. A method of manufacturing light weight high thermal resistance structural building blocks, comprising thoroughly mixing an expanded ceramic aggregate together with cement in the porportions of approximately 24 parts of aggregate per part of cement by volume, adding a minimum amount of potable water to the ceramic and cement sufficient to agglomerate the mixture, mixing the ceramic, cement and water mixture thoroughly until the mixture is tacky but not soupy or adhesive, curing the mixture in air for at least 24 hours to obtain non-adhering agglomerated particles, and thereafter mixing the agglomerated particles with cementious material and water to form blocks.

14. In the method as recited in claim 13, wherein said ceramic aggregate comprises perlite weighing approximately 7 to 8 pounds per cubic foot.

15. In the method as recited in claim 14, wherein said cement comprises the group consisting of Portland cement type I and type III.

16. In the method as recited in claim 15, wherein said cementious material comprises a mixture of cement, fly ash and an air entrainer.

17. A method of manufacturing an agglomerated particulate for use in the production of light weight high thermal resistance structural building blocks, comprising thoroughly mixing an expanded ceramic aggregate together with cement in the porportions of approximately 24 parts of aggregate per part of cement by volume, adding a minimum amount of potable water to the ceramic and cement sufficient to agglomerate the mixture, mixing the ceramic, cement and water mixture thoroughly until the mixture is tacky but not soupy or adhesive, curing the mixture in air for at least 24 hours.

18. In the method as recited in claim 17 wherein said ceramic aggregate comprises perlite weighing approximately 7 to 8 pounds per cubic foot.

19. In the method as recited in claim 18, wherein said cement comprises the group consisting of Portland cement type I and type III.

* * * * *